(12) United States Patent
Pascale Neto (10) Patent No.: US 9,517,426 B2
(45) Date of Patent: Dec. 13, 2016

(54) OIL FILTER (71) Applicant: PARKER HANNIFIN INDÚSTRIA E COMÉRCIO LTDA., Jacareí-SP (BR)

(72) Inventor: Genaro Pascale Neto, São Paulo-SP (BR)

(73) Assignee: PARKER HANNIFIN INDÚSTRIA E COMÉRCIO LTDA., Jacareí-SP (BR)

( * ) Notice: Subject to any disclaimer, the term of this patent is extended or adjusted under 35 U.S.C. 154(b) by 0 days.

(21) Appl. No.: 14/439,365

(22) PCT Filed: Aug. 5, 2013

(86) PCT No.: PCT/BR2013/000292
§ 371 (c)(1),
(2) Date: Apr. 29, 2015

(87) PCT Pub. No.: WO2014/066961
PCT Pub. Date: May 8, 2014

(65) Prior Publication Data
US 2015/0238886 A1 Aug. 27, 2015

(30) Foreign Application Priority Data
Oct. 29, 2012 (BR) .............................. 102012027727

(51) Int. Cl.
*B01D 29/11* (2006.01)
*B01D 35/34* (2006.01)

(52) U.S. Cl.
CPC ............... *B01D 35/34* (2013.01); *B01D 29/11* (2013.01); *B01D 2201/295* (2013.01);
(Continued)

(58) Field of Classification Search
CPC ... B01D 35/34; B01D 29/11; B01D 2201/305; B01D 2201/295; B01D 2201/4076; B01D 2201/4084
See application file for complete search history.

(56) References Cited

U.S. PATENT DOCUMENTS

| 5,593,577 A * | 1/1997 | Imai ..................... B01D 35/147 210/232 |
| 7,237,682 B2 * | 7/2007 | Reynolds ............... B01D 29/21 210/238 |

(Continued)

*Primary Examiner* — Krishnan S Menon
*Assistant Examiner* — Waqaas Ali
(74) *Attorney, Agent, or Firm* — Abelman, Frayne & Schwab (57) ABSTRACT

The filter has a head (10) with an oil inlet and an oil outlet (11,12), and to which is coupled an open end (21) of a cup (20) lodging a filtering element (30) which has an inner central chamber (32) and an outer annular chamber (33), connected to the oil inlet and oil outlet (11,12). A top cap (50) has a median annular portion (52) affixed to the filtering element (30), and a peripheral portion (53) with windows and positioned on an open end (33a) of the outer annular chamber (33) and seated onto the open end (21) of the cup (20). Rotational locking means (60) and axial locking means (80) are incorporated to the open end (21) of the cup (20) or to the peripheral portion (53) of the top cap (50), it being further provided, in the other of said parts, rotational locking receiving means (70) and axial locking receiving means (90), in which are fitted and retained the rotational locking means (60) and the axial locking means (80).

6 Claims, 7 Drawing Sheets

(52) U.S. Cl.
CPC ............... *B01D 2201/305* (2013.01); *B01D 2201/4076* (2013.01); *B01D 2201/4084* (2013.01)

(56) References Cited

U.S. PATENT DOCUMENTS

| | | | |
|---|---|---|---|
| 2003/0062301 A1* | 4/2003 | Merrie | B01D 29/114 210/454 |
| 2011/0089104 A1* | 4/2011 | Menez | B01D 29/21 210/487 |
| 2011/0147297 A1* | 6/2011 | Core | B01D 29/21 210/232 |

* cited by examiner

OIL FILTER

FIELD OF THE INVENTION

The present invention refers to an oil filter to be particularly, but not exclusively, used for oil filtration, with the purpose of separating the particulate contaminants eventually existing in the oil to be supplied to an engine or any other equipment which requires said oil to operate.

PRIOR ART

The present invention refers to a filter utilized for separating particulate material from a liquid, usually a lubricant oil. The term lubricant oil should be understood herein as encompassing oil and other liquids which require the same type of filtration before the effective use thereof.

There are well known in the art the filters of the type considered herein and which comprise: a head provided with an oil inlet and an oil outlet, which are coupled, in series, to a tube which supplies oil to a consuming unit, for example, an engine, or a machine; a cup having an open end, hermetically coupled to the head, and a closed end; and a filtering element, having a filtration tubular sidewall, being mounted in the interior of the cup and defining an inner central chamber, with a closed end, turned to the closed end of the cup and spaced from the latter, and with an opposite end turned to the head and open to the oil inlet of the latter, and an outer annular chamber, defined in the interior of the cup and having an end turned to the head and open to the oil outlet of the latter. The tubular sidewall of the filtering element carries an base cap, which hermetically seals the ends of the inner central chamber and of said tubular sidewall turned to the closed end of the cup, and a top cap, having a central nozzle coinciding with the open end of the inner central chamber, a median annular portion hermetically closing the adjacent end of the tubular sidewall of the filtering element, and a peripheral portion disposed on the adjacent end of the outer annular chamber and to be seated on a peripheral edge of the open end of the cup, said peripheral portion being provided with windows communicating said outer annular chamber with the oil outlet of the head.

With this filter construction, the liquid oil, after being supplied, for example, to the inner central chamber, from the head inlet, is forced to pass, radially, through the tubular filtering element, to the inside of the outer annular chamber, from which it is released, already in the filtered condition, to the head outlet, through the windows of the peripheral portion of the top cap of the filtering element.

A construction of the type mentioned above and used in a fuel filter is disclosed in U.S. Pat. No. 6,248,236 B1. Although operating adequately during the useful life thereof, these known prior art filters have the positioning of the filtering element in the interior of the cup guaranteed only by the seating of the peripheral portion of the top cap onto the peripheral edge of the open end of the cup, and by the fitting of an inner tubular projection of the top cap in the interior of the open end of the cup.

Such known type of assembly of the filtering element provides, neither the rotational locking, nor the axial locking of the filtering element in the cup, before the latter has its open end mounted to the head, generally by means of threads. Therefore, in the prior art solutions, the final fixation of the filtering element can be only achieved after the cup is coupled to the head.

As a function of said mounting characteristic, only by seating the filtering element in the cup, as disclosed in the prior art, it is desirable to develop an oil filter of the type described above, but which presents a more reliable assembly of the filtering element in the cup of the filter.

DISCLOSURE OF THE INVENTION

The present invention has the object of providing an oil filter, particularly lubricant oil, of the type defined above and which can have its filtering element reliably and correctly mounted and affixed to the cup of the filter, before the latter is coupled to the head.

According to the invention, the oil filter presents the construction described above and also comprises, in a particular form: at least one rotational locking means and at least two axial locking means, which are incorporated to one of the parts defined by the peripheral edge of the open end of the cup and by the peripheral portion of the top cap of the filtering element; at least one rotational locking receiving means and at least two axial locking receiving means, which are provided in the other of said parts and inside which are respectively fitted the rotational locking means and the axial locking means, upon the fitting of the peripheral portion of the top cap onto the peripheral edge of the open end of the cup, in order to respectively produce the rotational and axial locking of the filtering element in the interior of the cup of the filter.

The construction defined above allows the filtering element to be correctly mounted and rotationally and axially retained in the interior of the cup of the filter, before said cup is secured, generally by threading, to the head of the filter, making the assembly easier, more reliable and accurate, and avoiding positioning errors of the filtering element, resulting in operational deficiencies of the filter.

BRIEF DESCRIPTION OF THE DRAWINGS

The invention will be described below, making reference to the appended drawings, given by way of example of a possible embodiment of the invention and in which.

DETAILED DESCRIPTION OF THE INVENTION

Figure 1:
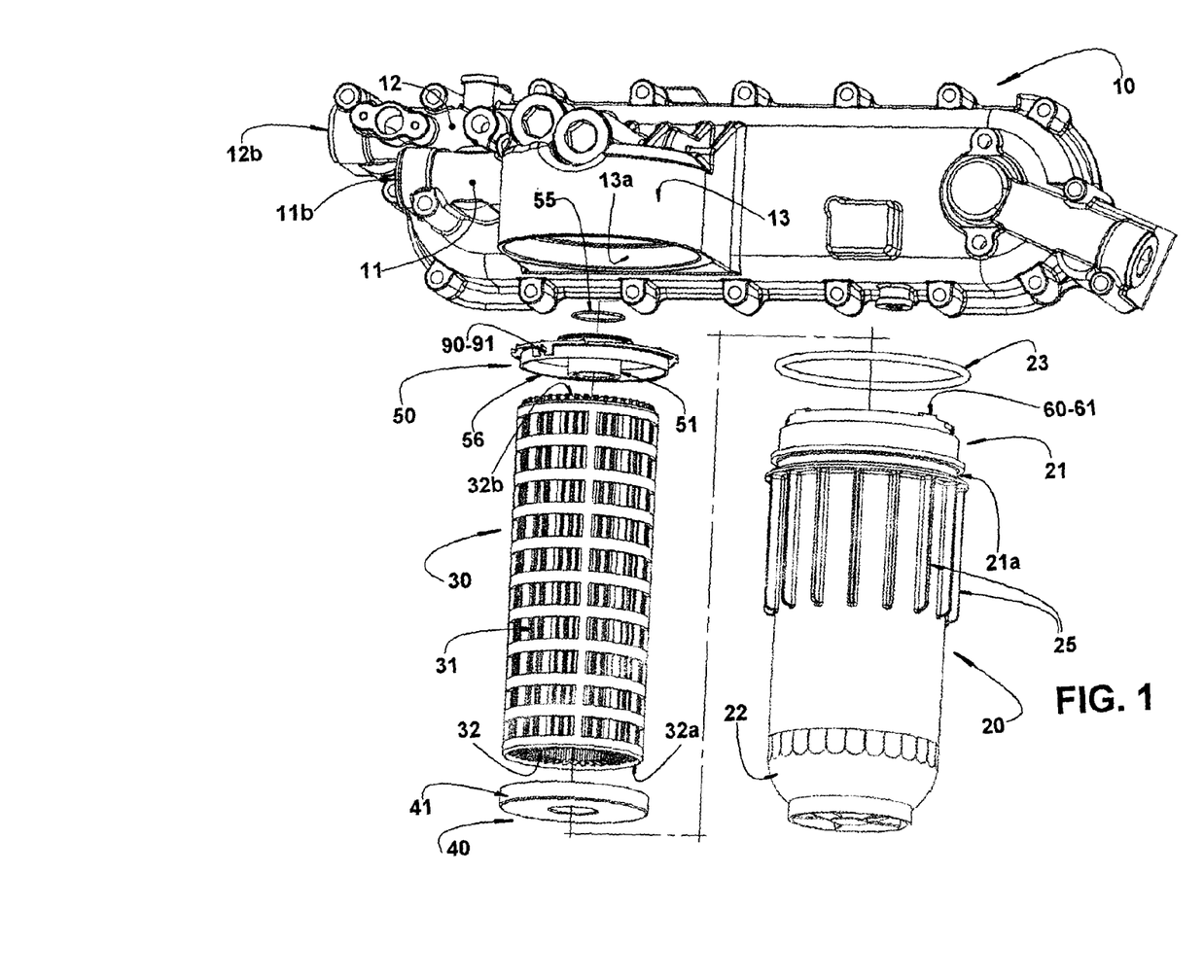
FIG. 1 represents an exploded perspective view of the elements constitutive of an embodiment of the present filter.
Figure 2:
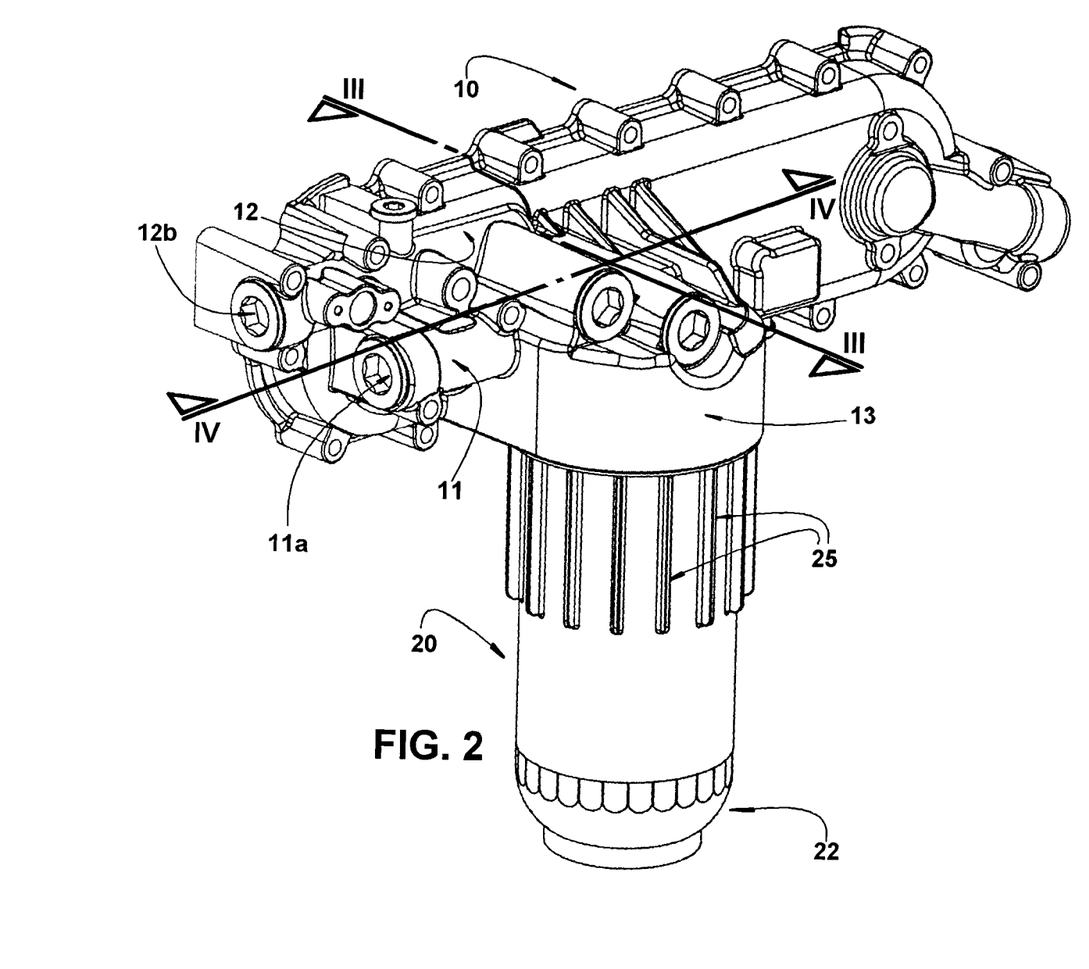
FIG. 2 represents an upper perspective view of the filter of FIG. 1 in the mounted condition.
Figure 3:
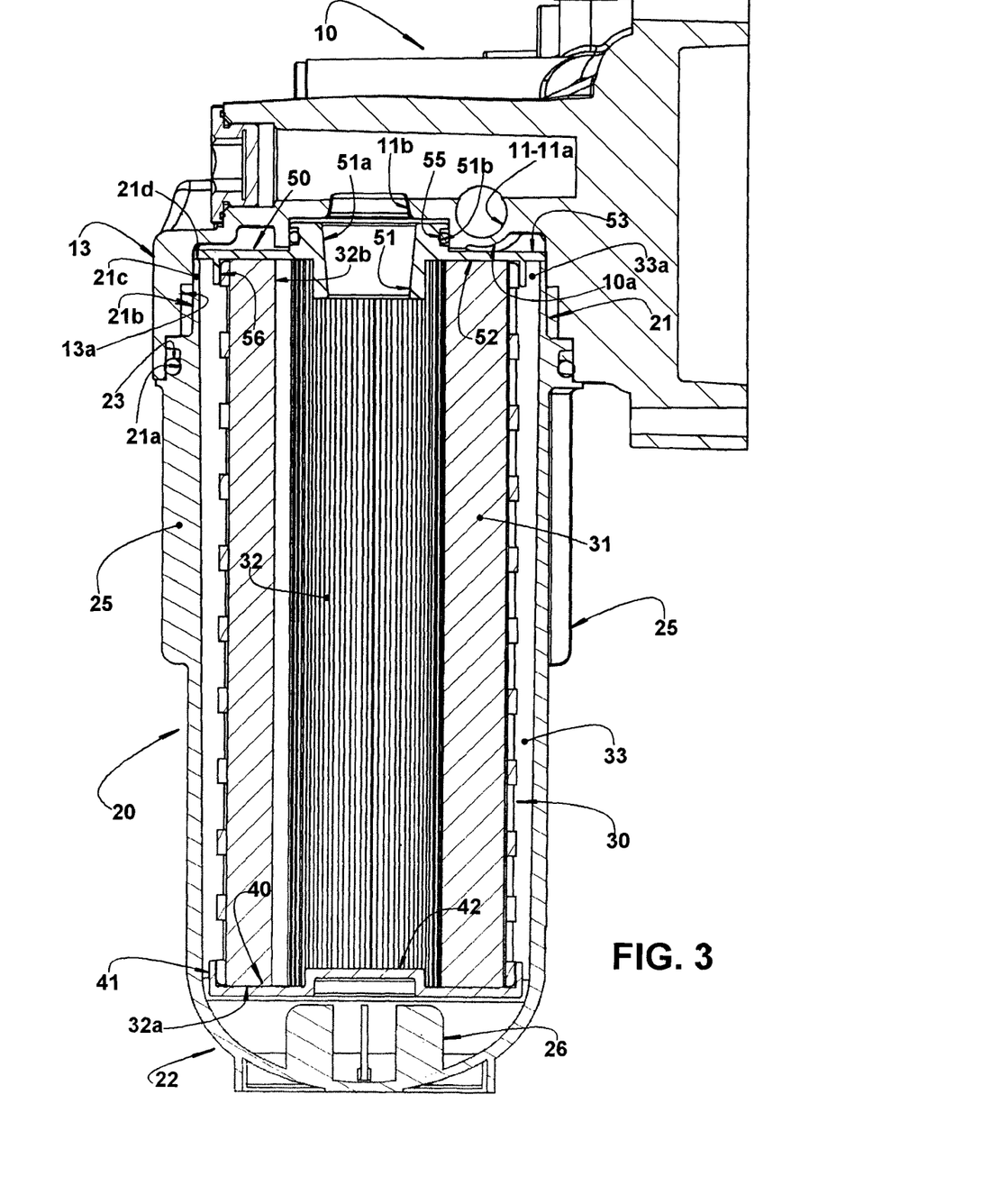
FIG. 3 represents a longitudinal sectional view of the filter, the section being taken according to line in FIG. 2 and illustrating the fluid communication between the oil inlet of the head and the inner central chamber of the filtering element.
Figure 4:
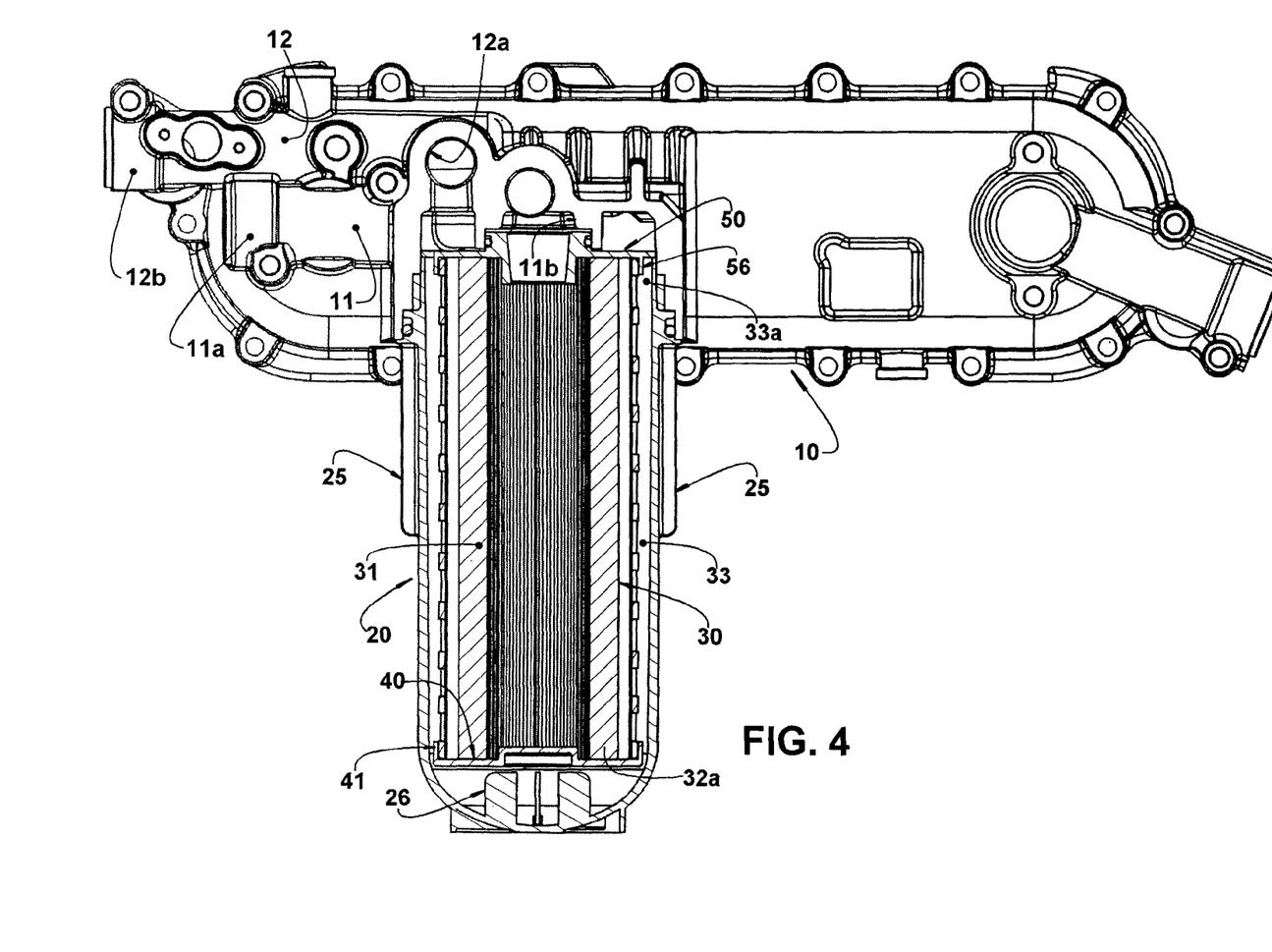
FIG. 4 represents a longitudinal sectional view of the filter, the section being taken according to line IV-IV in FIG. 2 and illustrating the fluid communication between the outer annular chamber of the filtering element and the oil outlet of the head.
Figure 5:
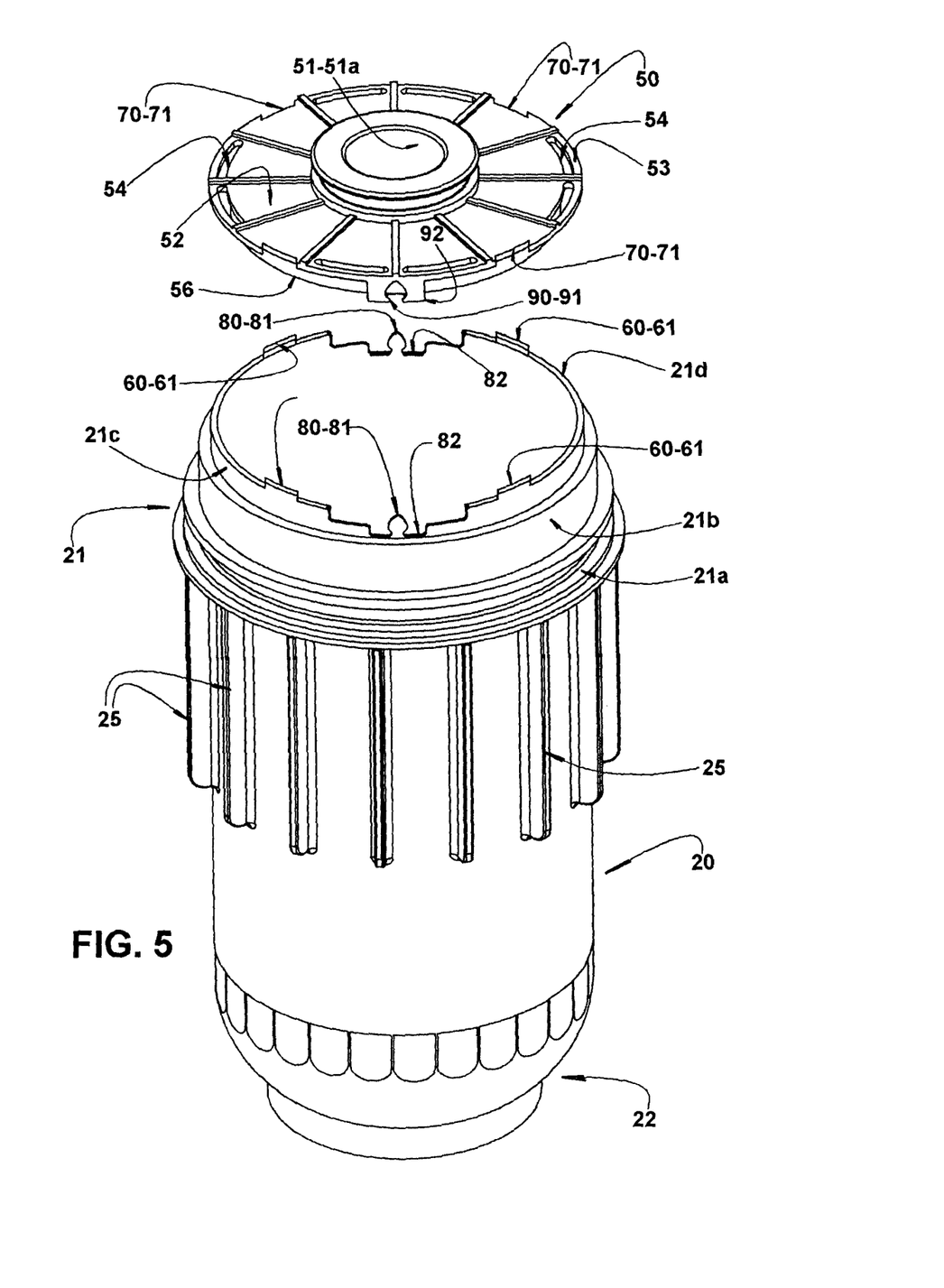
FIG. 5 represents an exploded upper perspective view of the top cap, without the filtering element and the cup of the filter.
Figure 6:
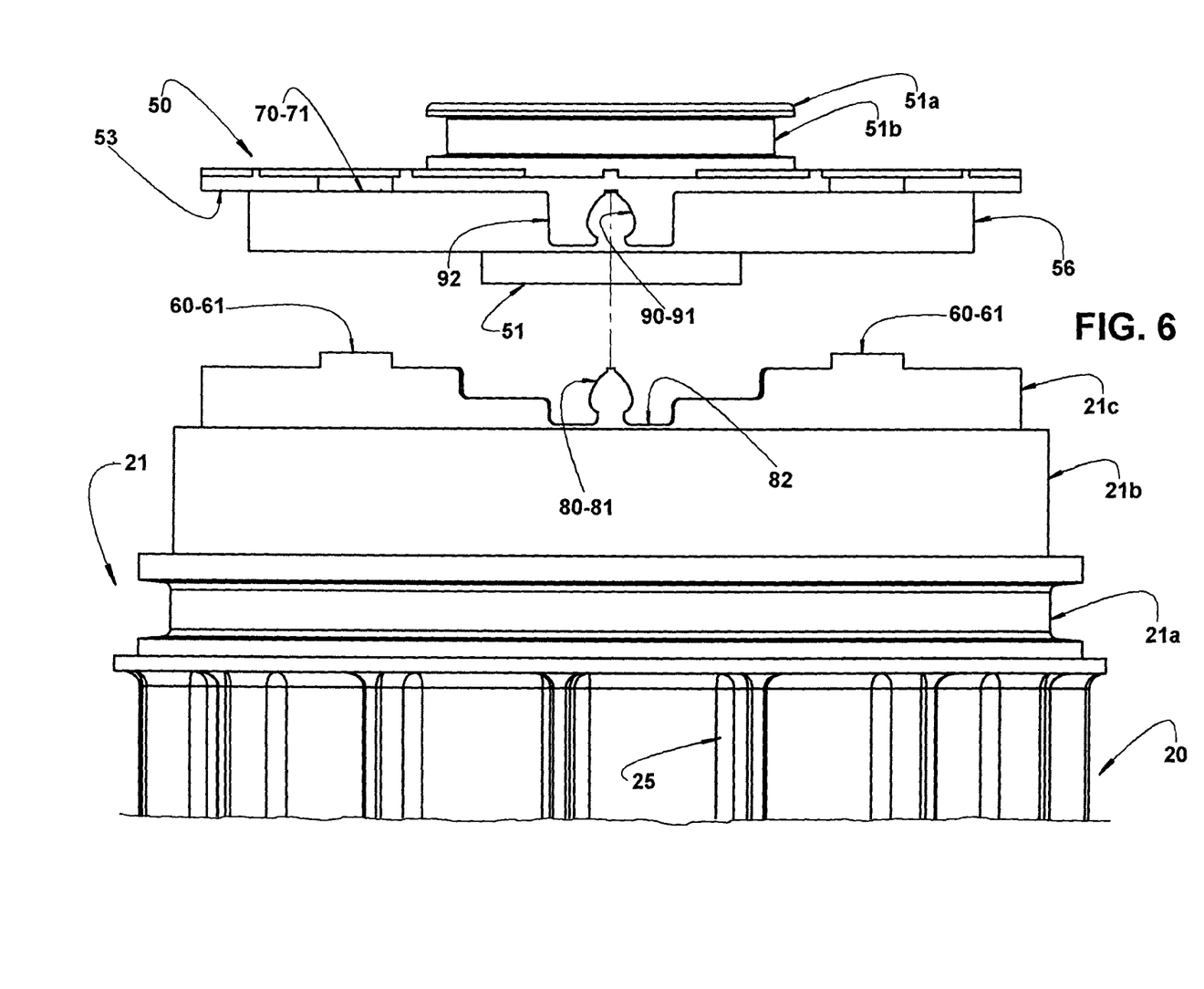
FIG. 6 represents an exploded lateral view of the top cap (without the filtering element) and of the open end of the cup of the filter.
Figure 7:
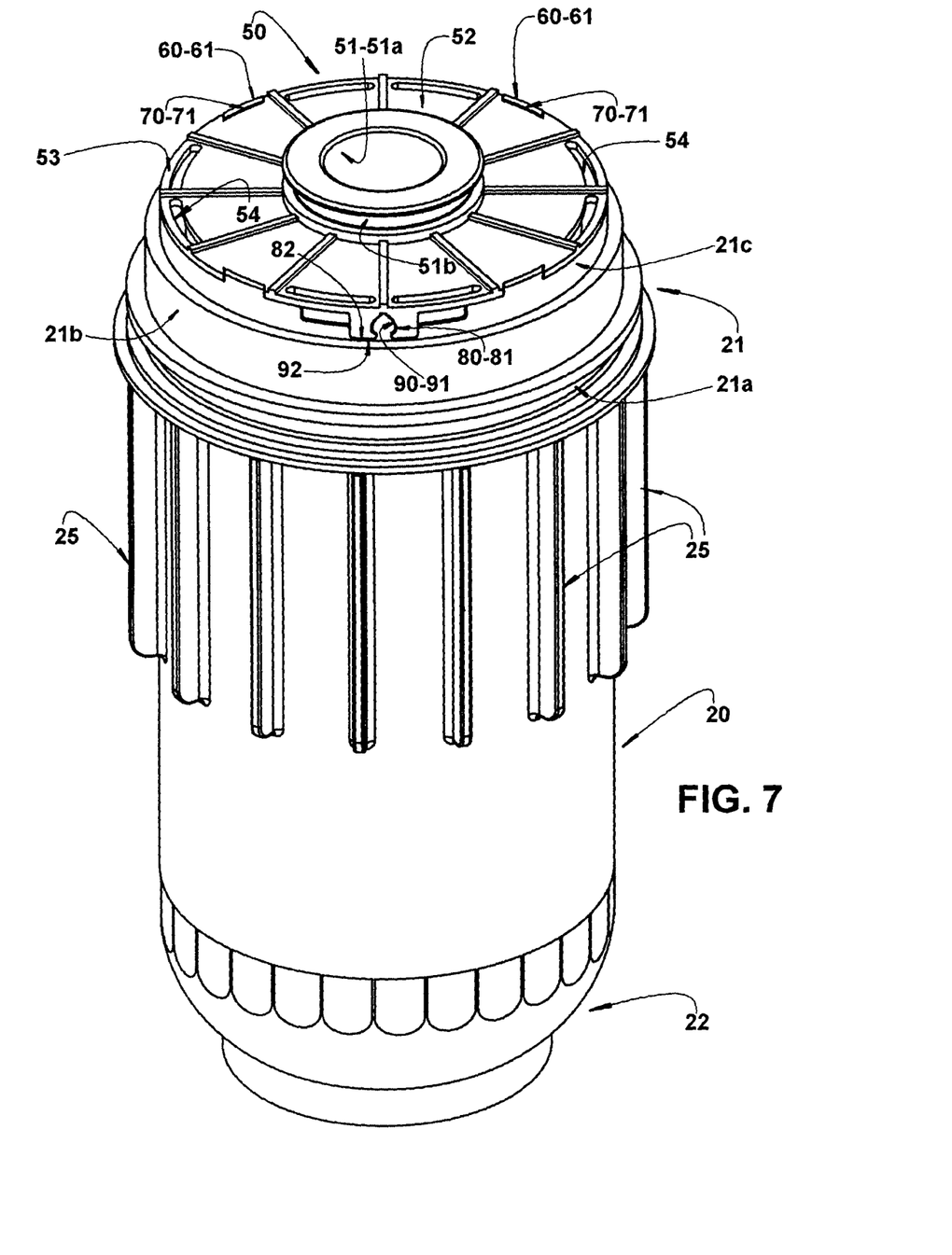
FIG. 7 represents an upper perspective view of the top cap, already incorporated to the filtering element and rotationally and axially locked in the peripheral edge of the open end of the cup of the filter.

As illustrated in the appended drawings, the present oil filter comprises a head 10 generally cast in a metallic alloy, for example, steel, or molded in a synthetic material, and mounted, in series, in a tube (not illustrated) for supplying oil, generally liquid lubricant oil, to a consuming unit, such as an engine. The head 10 presents an oil inlet 11, formed by an inner channel, having an inlet end 11a, radially and internally threaded, to be coupled to the supply tube (not illustrated) and a central outlet end 11b, axially disposed and open to a lower face 10a of the head 10. At least one second channel, internal to the head 10, defines an oil outlet 12 which presents an annular inlet end 12a, open to said lower face 10a of the head, and an outlet end 12b, radially and internally threaded, to be coupled to the tube which conducts the already filtered oil (not illustrated). In the illustrated construction, the oil outlet 12 has its inlet end 12a defined in a lower axial nozzle 13, with a tubular configuration and projecting downwardly from the lower face 10a of the head 10 and being provided with an inner thread 13a.

The filter further comprises a cup 20, generally cylindrical, formed in an adequate material, for example, in metallic alloy or polymeric material, having an open end 21, to be hermetically coupled in the interior of the lower axial nozzle 13 of the head 10, and a closed end 22.

In the illustrated construction, the open end 21 of the cup 20 is provided with at least one outer circumferential groove 21a, dimensioned to lodge a sealing ring 23 and followed by an outer thread 21b, which ends in a tubular projection 21c of reduced contour and axially extending, which ends in a peripheral edge 21d of the open end 21 of the cup 20. The construction described above allows the cup 20 to have the outer thread 21b of its open end 21 engaged with the inner thread 13a of the lower axial nozzle 13 of the head 10, coupling the open end 21 of the cup 20 to the head 10, while the sealing ring 23 is radially compressed against a smooth inner wall region of said lower axial nozzle 13, guaranteeing the tightness of the coupling. It should be understood that the coupling of the cup 20 to the head 10 may be achieved by several manners, provided that they assure a firm and tight fixation between said parts.

In order to facilitate its grasping, either manual or by using a tool, during the mounting and demounting operations in relation to the head 10, the cup 20 is generally provided, in a single piece, with a plurality of outer longitudinal ribs 25, which extend from the region of the outer circumferential groove 21a, towards a median region of the cup 20.

In the interior of the cup 20 is mounted a filtering element 30 provided with a tubular sidewall 31, formed in a filtration material and which defines an inner central chamber 32, having a closed end 32a and an open end 32b which is connected to the oil inlet 11 of the head 10, and an outer annular chamber 33, internal to the cup 20 and having an open end 33a which is connected to the oil outlet 12 of the head 10.

At the end of the filtering element 30, turned to the closed end of the cup 20, is affixed an base cap 40, constructed in metal or in polymer and which defines the closed end 32a of the inner central chamber 32 and which closes the adjacent end of the tubular sidewall 31. In the illustrated construction, the base cap 40 incorporates an outer peripheral flange 41, configured to tightly surround a portion of the end of the tubular sidewall 31, against which end is affixed the base cap 40, and also a central tubular flange 42 which is tightly fitted in the interior of said end of the tubular sidewall 31. The fixation of the base cap 40 in the filtering element 30 may be carried out in different ways, such as, for example, by adhesive.

The cup 20 may further incorporate, internally in its closed end 22, stop elements 26 configured to cooperate with the base cap 40, having the function of supporting the base cap 40, in case the internal pressure of the filtering element 30 increases, avoiding great deformations and possible breakage of the base cap 40.

To the end of the filtering element 30, turned to the head 10, is affixed a top cap 50, constructed in polymer and which presents a central nozzle 51, of tubular shape, connected to the open end 32b of the inner central chamber 32, a median annular portion 52, closing the adjacent end of the tubular sidewall 31 of the filtering element 30, and a peripheral portion 53, provided with windows 54 and which is positioned on the open end 33a of the outer annular chamber 33 and to be seated on the peripheral edge 21d of the open end 21 of the cup 20. The windows 54 allow the outer annular chamber 33 to be connected to the oil outlet 12 of the head 10, and allow the peripheral portion 53 of the top cap 50 to be seated on the peripheral edge 21d of the open end 21 of the cup 20.

In the illustrated construction, the top cap 50 has its central nozzle 51 defined by a tubular projection which is tightly fitted in the interior of the open end 32b of the inner central chamber 32, said tubular projection extending to the other side of the top cap 50, towards the head 10, defining a neck 51a to be fitted in the interior of the outlet end 11b of the oil inlet 11 of the head 10. The neck 51a is provided with a circumferential groove 51b in which is housed a sealing ring 55, generally in elastomer and which acts radially against the interior of the outlet end 11b of the oil inlet 11, guaranteeing the tightness of this connection.

The top cap 50 further incorporates a tubular skirt 56 turned to the filtering element 30 and which is radially spaced back in relation to the periphery of the top cap 50 and configured to be tightly fitted around an adjacent end of the tubular sidewall 31 of the filtering element 30. The fixation of the top cap 50 to the filtering element 30 may be effected by different ways, as for example, by adhesive.

According to the invention, the filter further comprises at least one rotational locking means 60, which is incorporated to one of the parts defined by the open end 21 of the cup 20 and by the peripheral portion 53 of the top cap 50, and at least one rotational locking receiving means 70, provided in the other of said parts 21, 53 and inside which is fitted and retained the rotational locking means 60, upon the seating of the peripheral portion 53 of the top cap 50 on the open end 21 of the cup 20.

In the illustrated construction, there are provided four rotational locking means 60, equally spaced from each other along the peripheral edge 21d of the open end 21 of the cup 20, each rotational locking means 60 taking the form of a projection 61 which projects axially from said peripheral edge 21d. In this case, there are provided four rotational locking receiving means 70, each of them being defined by a marginal radial recess 71 provided in the peripheral portion 53 of the top cap 50. Thus, upon the seating of the peripheral portion 53 of the top cap 50 onto the peripheral edge 21d of the open end 21 of the cup 20, each one of the projections 61 is fitted and retained in the interior of a respective marginal radial recess 71, rotationally locking the top cap 50 and, consequently, the filtering element 30 in the interior of the cup 20.

The filter further comprises at least two axial locking means 80, incorporated to one of the parts defined by the open end 21 of the cup 20 and by the peripheral portion 53 of the top cap 50, and at least two axial locking receiving means 90, provided in the other of said parts 21,53 and in the interior of each one being fitted and retained one axial locking means 80, upon the seating of the peripheral portion 53 of the top cap 50 onto the open end 21 of the cup 20.

In the illustrated construction, there are provided two axial locking means 80, spaced from each other along the peripheral edge 21d of the open end 21 of the cup 20, each axial locking means 80 being defined by a projection 81, in the form of a rounded arrow axially projecting from the bottom of an axial recess 82 provided in the tubular projection 21c, of reduced contour and which defines a peripheral edge 21d of the open end 21 of the cup 20. In this construction, there are provided two axial locking receiving means 90, each of them being defined by an axial recess 91, having a contour corresponding to that of the projection 81 and provided in a respective peripheral skirt segment 92, elastically deformable, incorporated to the top cap 50 and turned to the filtering element 30.

In the proposed construction, the peripheral skirt segments 92 are concentric and radially external to the tubular skirt 56 of the top cap 50 and provided in the axial projection of the peripheral edge 21d of the open end 21 of the cup 20.

Thus, upon the seating of the peripheral portion 53 of the top cap 50 on the peripheral edge 21d of the open end 21 of the cup 20, each peripheral skirt segment/section 92 is fitted in a respective axial recess 82 of the cup 20, whereas each one of the projections 81, in the form of a rounded arrow, is fitted and retained, as a dove tail, in the interior de um respective axial recess 91, axially locking the top cap 50 and, consequently, the filtering element 30 in the interior of the cup. 20.

While only one preferred embodiment of the present invention has been illustrated herein, it should be understood that changes as to the form and relative positioning of the elements may be carried out, without departing from the inventive concept defined in the claims that accompany the present disclosure.

The invention claimed is:

1. An oil filter, comprising: a head (10) having an oil inlet and an oil outlet (11, 12); a cup(20) having an open end (21) coupled to the head (10); a filtering element (30) internal to the cup (20) and defining an inner central chamber (32) and an outer annular chamber (33), each one being provided with an open end (32b, 33a) connected to the oil inlet and the oil outlet (11, 12), respectively; a top cap (50) having a central nozzle (51) connected to the open end (32b) of the inner central chamber (32), a median annular portion (52)closing the adjacent end of the filtering element (30) and a peripheral portion (53) provided with windows and positioned on the open end (33a) of the outer annular chamber (33) and seated onto the open end (21) of the cup (20); at least one rotational locking means (60) and at least two axial locking means (80) which are incorporated to one of parts defined by the open end (21) of the cup (20) and by the peripheral portion (53) of the top cap (50); at least one rotational locking receiving means (70) and at least two axial locking receiving means (90), provided in the other of said parts (21, 53) and in an interior of which are respectively fitted and retained the rotational locking means (60) and the axial locking means (70), upon seating of the peripheral portion (53) of the top cap (50) onto the open end (21) of the cup (20), characterized in that each axial locking means (80) is defined by a projection (81), in form of a rounded arrow axially projecting from the open end (21) of the cup (20), and two axial locking receiving means (90) are provided, each of them being defined by an axial recess (91), with a contour corresponding to that of the projection (81) and provided in a respective peripheral skirt segment (92), each being elastically deformable and incorporated to the top cap (50) and facing a respective axial projection (81).

2. The oil filter, according to claim 1, characterized in that the rotational locking means (60) takes a form of a projection (61) which projects axially from the open end (21) of the cup (20), the rotational locking receiving means (70) being defined by a marginal radial recess (71) provided in the peripheral portion (53) of the top cap (50).

3. The oil filter, according to claim 2, in which the open end (21) of the cup (20) is provided with a tubular projection (21c) extending axially to end in a peripheral edge (21d), the filter being characterized in that the projection (61) projects axially from the peripheral edge (21d) of the open end (21) of the cup (20).

4. The oil filter, according to claim 3, characterized in that four rotational locking means (60) are provided, equally spaced from each other along the peripheral edge (21d) of the open end (21) of the cup (20), as well as four rotational locking receiving means (70).

5. The oil filter, according to claim 1, characterized in that the filter presents the open end (21) of the cup (20) provided with a tubular projection (21c) extending axially to end: in a peripheral edge (21d), wherein the projection (81) of each axial locking means (80) projects axially from a bottom of an axial recess (82) defined in the tubular projection (21c).

6. The oil filter, according to claim 1, the top cap (50) incorporates a tubular skirt (56) turned to the filtering element (30) and which is radially spaced back in relation to a periphery of the top cap (50) and configured to be tightly fitted, around an adjacent end of a tubular sidewall (31) of the filtering element (30), wherein the peripheral skirt segments (92) are concentric and radially external to the tubular skirt (56) and positioned in an axial projection of the peripheral edge (21d) of the open end (21) of the cup (20).

* * * * *